Sept. 25, 1962  D. C. BERTOSSA  3,055,096
METHOD FOR CLADDING AND PRODUCT RESULTING THEREFROM
Filed June 19, 1959
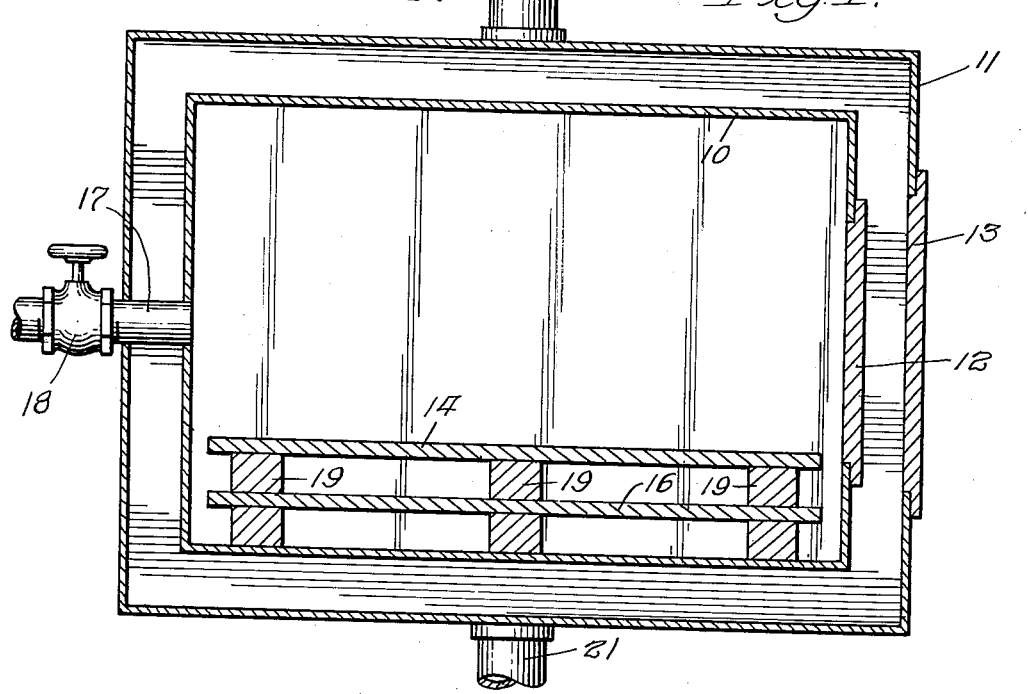
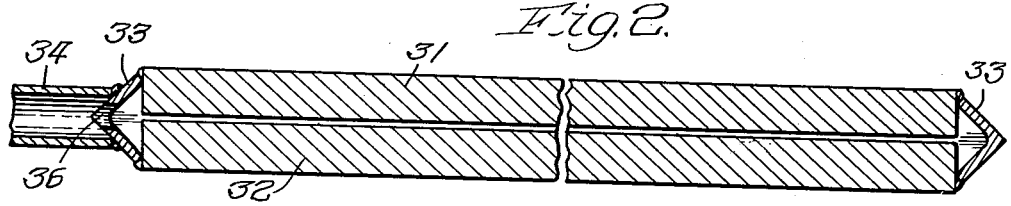
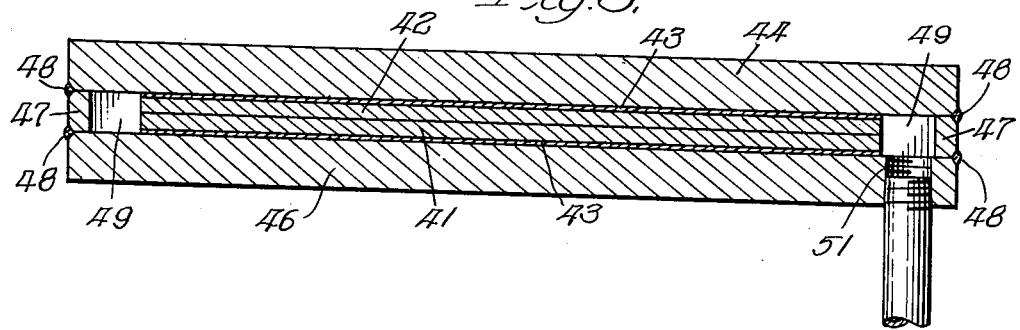
Inventor:
Donald C. Bertossa,
By Merriam, Lynch & Smith,
Attys.

3,055,096
METHOD FOR CLADDING AND PRODUCT RESULTING THEREFROM
Donald C. Bertossa, Birmingham, Ala., assignor to Chicago Bridge & Iron Company, a corporation of Illinois
Filed June 19, 1959, Ser. No. 821,472
8 Claims. (Cl. 29—471.5)

This invention relates to methods for cladding metals and to the products resulting therefrom.

Clad metals, particularly clad ferrous metals such as steels, have been manufactured and used for a considerable period. A clad steel sheet is a composite sheet usually consisting of a commercial grade steel sheet to one or both sides of which there is permanently joined a veneer or cladding, usually of a corrosion resistant or heat resistant metal. The thickness of the cladding metal, as contrasted with plating, constitutes a substantial portion (generally not less than 5%) of the total sheet or plate thickness. There is, of course, no upper limit on the thickness of the cladding metal except that dictated by economy. Usually the cladding metal will have a thickness of from 20 gauge to ¼" or more. Steels have been clad with stainless steel, Monel, silver, copper, nickel, and the like.

It is known to produce clad metals by means of a vacuum brazing operation described in Patent No. 2,713,196, issued to R. L. Brown on July 19, 1955. In accordance with the method disclosed in that patent, a sheet or plate of metal to be clad and a sheet or plate of a cladding metal are assembled in a sandwich in substantially face-to-face arrangement with a thin layer of brazing metal between them. There is then created a substantial vacuum, generally at least 18 inches of mercury gauge (i.e., at least 18" of mercury below atmospheric pressure) in the area to be clad, i.e., between the cladding plate and the base plate. The sandwich is then heated to a brazing temperature sufficient to cause the brazing material to melt and wet the mating surfaces, while maintaining the vacuum which has previously been established. In this way a bond is formed between the cladding plate and the base plate. After brazing is effected, the sandwich is cooled below the melting range of the brazing material to complete the cladding process.

The above-described vacuum brazing process is generally successful in producing clad products in which a continuous integral bond is produced without reducing the thickness of the cladding plate or the base plate in the process and without creating any disturbance or distortion in these plates. Occasionally, however, difficulty has been experienced in obtaining perfect bonds between the cladding and the base plates. These difficulties have been particularly pronounced in the cladding of relatively thick base plates (i.e., about ½" and more in thickness) and in those instances when the brazing metal or the cladding plates contain any of a number of metals, especially manganese and chromium, which are particularly sensitive to oxygen and have oxides which are relatively stable at elevated temperatures and high vacuums.

In many backing plates used for cladding operations, particularly thick steel plates, rough surfaces exist which contain laps, rolled in oxides, scabs, etc. In or under these plate imperfections there are materials which volatilize in the vacuum bonding operation, thus creating a source of oxygen and other gases at relatively high temperatures. This source is in addition to occluded surface gases and gases entrapped in the metal interior. When this volatile material is present in sizable quantities the vacuum may be reduced for a period of time at elevated temperature and the bonding surfaces may then be superficially oxidized. This superficial oxidation can reduce brazing alloy wetting if it is not subsequently reduced and it can also combine with alloying elements in the involved materials which thereafter resist dissociation in the bonding environment.

This problem is particularly aggravated when there is present as a component of the brazing metal or of the cladding plate a metal whose oxide forms readily and then is relatively stable at the vacuum and temperature conditions used in the bonding operation. Examples of such metals are manganese, found in a preferred brazing material in combination with nickel, and chromium, a component of stainless steels. Other metals which may cause difficulty in the same manner as manganese and chromium are aluminum, titanium, zirconium, and molybdenum. When in the conventional brazing operation occluded gases are driven off the plate surfaces or are released from the dissociation of oxides embedded in the plate, the oxygen present can combine with these metals (e.g., the manganese in a brazing foil or the chromium in a stainless cladding plate) to produce oxides which do not dissociate at the temperatures (usually not more than 2100° F.) used in brazing. The oxides thus formed prevent proper wetting of the surfaces to be brazed or, by lodging in the bond zone, materially decrease the bond strength or entirely prevent the formation of a bond.

In accordance with the invention, the backing plates which are used to form clad plates are vacuum degassed in a separate operation in the absence of the brazing metal and the cladding plate. In this way, occluded gases and gases resulting from the dissociation of embedded oxides are removed without danger of the formation of stable oxides such as those of manganese and chromium. The plates are heated to a temperature of about 1700° F. to 2000° F. or more while maintaining a vacuum on the surface which is to be clad. The degree of vacuum to be used is not critical. Any substantial vacuum, e.g., a vacuum of 18 inches of mercury referred to a normal barometer, can be used to advantage. However, the rate of degassing increases as the vacuum is increased, so that it will generally be advantageous to use as low a vacuum as can be produced conveniently, and advisably a vacuum sufficient to reduce the absolute pressure to a value of 2000 microns of mercury or less. It may also be found advisable to use an inert gas such as nitrogen or a reducing gas such as hydrogen occasionally to sweep out the treated zone and to avoid clamping the plates together with full vacuum force during the entire degassing cycle.

After the temperature and vacuum have been maintained for a period ranging from a few minutes to several hours, depending on the volume of occluded gases and the amount of embedded oxides, the plate is allowed to cool to room temperature under vacuum. In this way gases are excluded from the surface of the plate while it is cooling, and when the cooled plate is exposed to air, the surface thereof does not rapidly absorb or adsorb any appreciable amount of gas and is in an extremely clean state. It is free of organic material and scale, thus presenting an optimum brazing surface that is not only substantially free of oxides but as clean in appearance as a freshly sandblasted surface. The plate can then be clad in the usual manner without the difficulties with imperfect and incomplete bonds heretofore encountered when steel surface quality was low or the steel contained a large amount of entrapped gases.

The invention will be better understood from the following description thereof taken in conjunction with the accompanying drawings, in which:

FIGURE 1 illustrates one method for degassing backing plates in accordance with the invention;

FIGURE 2 illustrates another method for degassing the backing plates; and

FIGURE 3 shows a suitable method for making clad plates using degassed backing plates.

There is illustrated in FIGURE 1 a suitable furnace which can be used for degassing backing plates in accordance with the invention. The furnace shown consists of an inner vessel 10 and an outer vessel 11, each of which is equipped with a suitable door (12 and 13) for introducing backing plates, e.g., 14 and 16, into the inner vessel. Door 12 should make a hermetic seal in vessel 10 so as to permit the establishment of a substantial vacuum in the enclosed space. The vacuum is maintained by means of line 17 which communicates through valve 18 to a suitable vacuum pump (not shown). The plates 14 and 16 stacked within the inner enclosure of the furnace are preferably separated by suitable blocks 19 made of a heat resistant or refractory material such as firebrick. Although only two plates are shown in the furnace of FIGURE 1, any number, limited only by the size of the furnace, may obviously be treated at the same time.

The furnace shown is fired by means of hot gases supplied through entrance pipe 21, said gases passing through the annular space between the inner and outer vessels of the furnace assembly and leaving through exit pipe 22 to a stack or other suitable disposal system. Although the furnace shown has been depicted as being gas fired, it will be obvious to those skilled in the art that any other method, such as electric heating, suitable for heating the furnace to the elevated temperature (about 2000° F. or more) needed can be used.

Another method which is suitable for degassing backing plates is shown in FIGURE 2. This method is particularly useful when a furnace such as that shown in FIGURE 1 is not available or when the plates are of an unusually large size. In this case, the plates 31 and 32 are placed in face-to-face contact and an angle 33 is welded to the plates around their periphery, thereby hermetically sealing a zone including the contacting faces of the plates. There is provided at any convenient point a line 34 communicating through a suitable opening 36 to the interior of the zone defined by the plates and angle. Line 34 is connected to a pump or other means (not shown) for establishing and maintaining a vacuum in the zone between the plates.

Regardless of the particular means used to degas the plates, i.e., whether a furnace such as that of FIGURE 1 is used or whether the plates are treated individually or in pairs as in FIGURE 2, the method used is essentially identical. After a vacuum is established at the surface of the backing plate or material to be treated, the plate is heated to an elevated temperature while the vacuum is maintained. It will be found that continuous evacuation during heating or drawing a vacuum by any means within the evacuated space when the assembly is hot serves to release and remove occluded and adsorbed gases as well as gases resulting from the dissociation of metal oxides and volatilized organic material. Prior to heating the plates, the vacuum system will normally have reduced the pressure within the confined zone to some low but relatively constant value determined by the capability of the pump or other means used to maintain the vacuum. As the plates are heated occluded gases are released and gases are also formed from the dissociation of embedded oxides in the plate. These gases are usually released at a rate faster than the vacuum pump can remove them from the system, so that the pressure in the vacuum zone is seen to rise. The rise in pressure is indicative of release of gases in this manner, and the increased pressure will be maintained as long as gases are being released at a relatively rapid rate. When the plate is substantially degassed, however, the pressure will again start to fall, showing that the outgassing peak has been passed and that most of the gases have been driven off the plate.

In practice, the time and temperature required to substantially degas any particular plate will obviously depend on the amount of occluded gasses and/or embedded oxides which will dissociate under the vacuum and temperature conditions used. The larger the plate and the rougher the surface thereof, the longer the heating period and the higher the temperature which may be required. In general, the times required may range from a few minutes in the case of thin, smooth plates to several hours for relatively thick plates with rough surfaces.

Temperatures of about 1700°–2000° F. will generally be found effective to achieve degassing in most instances. Temperatures much above about 2000° F. should not be used in those cases where steel plates are maintained in direct face-to-face contact during the degassing operation, as shown in FIGURE 2, since at these temperatures there may occur solid state diffusion between plates which may cause difficulty in separating them. This difficulty is not encountered at temperatures below about 2000° F. which are therefore the preferred temperatures for use when there exists a possibility that the plates may stick together. When separating materials can be used, higher degassing temperatures may be advantageous.

In order to reduce the amount of gas evolved during the degassing operation, it is preferred that the plates be cleaned of surface contaminants such as oil, mill scale or scale formed in any heat treating operations prior to degassing. If a particularly heavy coating of scale or other contaminant exists on a plate, it may be difficult or impossible to properly prepare the surface for cladding even by the use of higher than usual temperatures and vacuum for extended periods of time. The contaminant can be removed by methods well known by those skilled in the art, such as sandblasting, pickling, flame descaling, and the like.

After degassing, the plates may be clad by any of the known methods for producing clad plates by vacuum brazing. A particularly useful method, shown in FIGURE 3, protects the cladding plate surfaces allows ready removal of gases formed during the cladding process, and utilizes materials with a minimum of waste. In this arrangement two cladding plates 41 and 42 are placed back-to-back. Against the outer surfaces of each cladding plate is placed brazing material 43 and in face-to-face arrangement with the brazing material are placed degassed base plates 44 and 46 of slightly larger size than the cladding plates. Bars 47 are welded 48 to the base plates to seal the interior of the sandwich thus formed from the atmosphere. The sandwich is then evacuated by means of corridor 49, outlet 51, and vacuum line 52. By evacuating the sandwich to a substantial vacuum, e.g., about 18 inches of mercury gauge or less, and preferably on the order of about 28–29 inches, the plates 44 and 46 are forced together with the pressure in the neighborhood of 2000 lbs. per square foot. Heat is then applied to the plates to raise the temperature of the brazing material 43 to its melting point which will normally be in the range of about 1700°–2000° F. This is well below the melting point of the material to be clad in the case of mild steel, and of the cladding material if the latter be a stainless steel. The vacuum is maintained during bonding at least until the brazing material has melted and the mating surfaces have been wet. Although at that time it may be released if desired, the vacuum is preferably maintained until the brazing material has cooled below its melting range. It is most desirable, however, to maintain the vacuum until the sandwich is cooled to an ambient temperature. After cooling, the cladding plate will be found to be securely bonded to the base plate by a fused layer of brazing material therebetween.

The process of the invention can be employed for cladding a great variety of base metals with any of a number of dissimilar metals. The most common use, however, will be for cladding steel such as structural and boiler or firebox grades of steel, which are usually low carbon steels or low alloy steels, e.g., T–1 (U.S. Steel Co.) and those designated by the American Society for Testing Materials as A283, grade C or D, A285, grade C, A201, A202, A203, A204, A212, A302, A387, and A357. In the case of low alloy steels such as T-1, degassing is particularly valuable prior to brazing since pickling operations leave a surface contamination similar to soot that is detrimental to bond quality. These backing metals are commonly clad with heat or corrosion resistant metals such as chromium or chromium-nickel stainless steels, nickel, Monel, Hastelloys, Inconel, silver, copper, tantalum, molybdenum, zirconium, titanium, and the like. Suitable brazing materials which can be used comprise metals and alloys having melting points below that of the metals to be joined. In addition to having a relatively low melting point, the brazing material must be capable, when melted, of wetting the mating surfaces of the metal plates and must have sufficient tensile strength and shear resistance to produce a union of sufficient soundness, strength, and permanence to meet operating or design specifications. The brazing metal may be, for example, copper, bronze, alloys of copper and silicon, copper and phosphorus, nickel base alloys, manganese base alloys, silver base alloys or any other suitable metal or alloy. The choice of the brazing material is well within the abilities of those skilled in the art and will depend on the particular metals being joined.

Particularly useful brazing materials for cladding ferrous plates with stainless steel are manganese-nickel alloys which do not interfere with the weldability of the clad plates by ordinary welding methods. However, as hereinbefore noted, manganese is readily oxidized and in addition forms a relatively stable oxide. Thus, the degassing operation of the invention is particularly desirable and advantageous when manganese-nickel alloys are used as the brazing material in making stainless steel clad.

The following examples are presented to illustrate the invention:

*Example 1*

Large, rough, heavy backing plates of type A212, grade B steel (7½′ to 8′ wide x 4½′ to 17½′ long x 2.3″ thick) were given a preliminary cleaning by sandblasting and/or pickling as required for the removal of surface mill scale. The plates were then encased for evacuation by placing them in face-to-face arrangement in pairs as shown in FIGURE 2 and weld sealing an angle to their edges, thus forming an envelope, which was evacuated to a pressure of about 225 microns of mercury without heating. The plates were then heated to a temperature of about 2000° F. within a period of about 3 hours. During this time the pressure in the evacuated space reached a maximum value of 4800 microns. The temperature was held at about 2000° F. for another 3 hours, during which time the pressure fell gradually to about 950 microns, at which time heating was discontinued and the plates were allowed to cool at ambient temperature while the vacuum was maintained.

After degassing as described above, these plates were clad with type 316L, stainless steel cladding (0.254″ thick), using as the brazing material a 70% manganese-30% nickel alloy foil by a method similar to that shown in FIGURE 3. The plates were found to be well bonded throughout, with the bond shear strength generally above 45,000 p.s.i. and in some cases about 50,000 p.s.i.

For comparison, similar plates were clad using the method and materials of Example 1 but without degassing the backing plates. The resultant cladding was found to be loose at the edges and large areas of unbonded clad were found in the interior of the plates. The bond shear strength was generally below 35,000 p.s.i.

The foregoing detailed description has been given for clearness of understanding only, and no unnecessary limitations should be understood therefrom, as modifications will be obvious to those skilled in the art.

What is claimed is:

1. In the method of brazing a base metal plate to a cladding metal plate which comprises placing the plates in substantially face-to-face arrangement with a thin layer of brazing material therebetween, at least one of said cladding plate and brazing material containing an element which forms a stable oxide at brazing temperatures, producing a vacuum between said plates, heating the assembled plates to a brazing temperature sufficient to melt the brazing material while maintaining said vacuum, and cooling the plates to below the melting range of the brazing material, the improvement comprising subjecting said base plate to a prior vacuum degassing treatment in which the surface of said plate which is to be clad is heated to an elevated temperature at a substantial vacuum in the absence of brazing material for a time sufficient to substantially free said plate of occluded and combined gases and dissociate oxides therein, and cooling said plate to ambient temperature while maintaining said vacuum.

2. The process of claim 1 wherein said degassing treatment is carried out at a temperature within the range of about 1700°–2000° F.

3. The method of claim 1 wherein said brazing material is an alloy of manganese and nickel.

4. The method of claim 1 wherein said base plate is given a cleaning treatment for removal of surface contaminants prior to said degassing operation.

5. The method of brazing a base metal plate to a cladding metal plate with a brazing material, at least one of said cladding plate and brazing material containing an element which forms a stable oxide at brazing temperatures, comprising heating said base plate to a temperature of about 1700°–2000° F., under a substantial vacuum in the absence of brazing material for a time sufficient to remove substantially all occluded gases from said plate and to cause the substantial dissociation of metal oxides embedded in said plate; cooling said plate to ambient temperature while maintaining said vacuum; releasing said vacuum and placing said plate in face-to-face arrangement with the other of said plates with a thin layer of brazing material therebetween, the adjacent metal plate surfaces being clean; hermetically sealing the edges of the plates to produce a chambered area therebetween but providing an opening to the chambered area for applying a vacuum condition therein; applying a vacuum of not less than about 18 inches of mercury gauge in the chambered area; heating the assembled plates to a brazing temperature sufficient to melt the brazing material while maintaining said vacuum, said metal plates being of such size and thickness that a major proportion of their contiguous surfaces move together at said brazing temperature and under said vacuum condition in the chambered area; and cooling the assembled plates to below the melting range of the brazing material while maintaining said vacuum in the chambered area.

6. The method of claim 1 wherein said degassing treatment is carried out under a vacuum of at least 18 inches of mercury gauge.

7. The method of claim 6 wherein said brazing material is an alloy of manganese and nickel and at least one of said plates contains chromium.

8. A composite clad product comprising a base plate and a cladding plate integrally and continuously bonded together by a brazing material between said plates, said product being produced by the method of claim 6.

References Cited in the file of this patent

UNITED STATES PATENTS

| | | |
|---|---|---|
| 867,763 | Still | Oct. 8, 1907 |
| 1,893,380 | Uschman et al. | Jan. 3, 1933 |
| 2,407,995 | Moyer | Sept. 24, 1946 |
| 2,713,196 | Brown | July 9, 1955 |

FOREIGN PATENTS

| | | |
|---|---|---|
| 487,263 | Great Britain | June 17, 1938 |